April 23, 1968
O. H. ZINKE
3,379,969
MAGNETIC BRIDGE MEANS FOR DETECTING THE
ELECTRICAL PROPERTIES OF SUBSTANCES
Original Filed Aug. 9, 1963
2 Sheets-Sheet 1
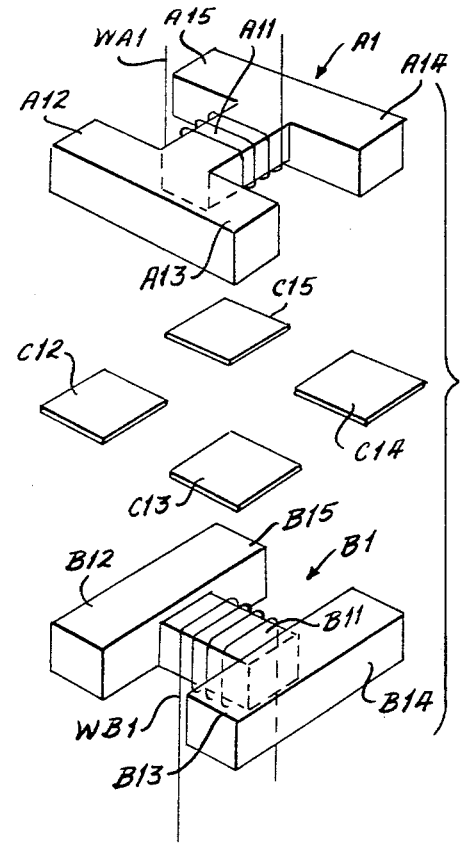
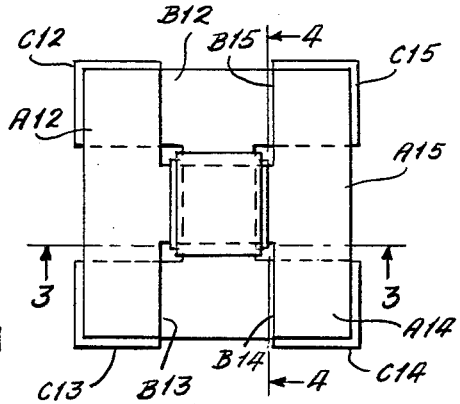
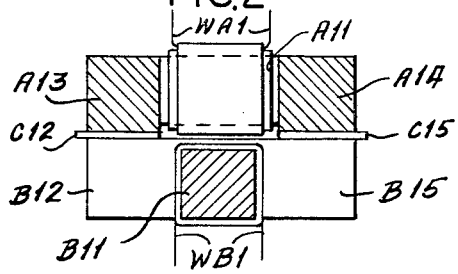
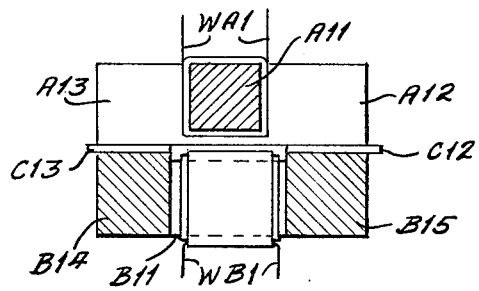
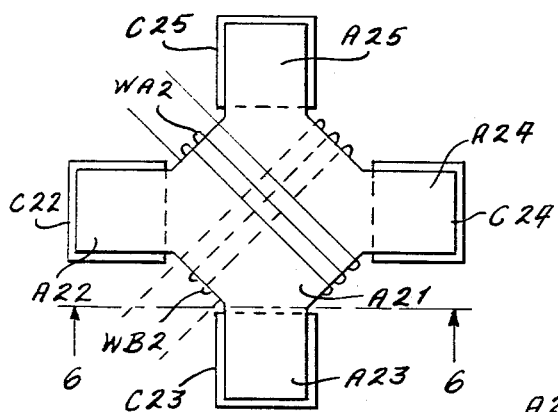
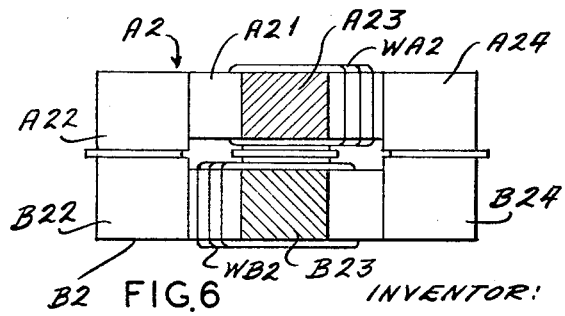
INVENTOR:
BY OTTO H. ZINKE
John E. Taylor
ATTORNEYS.

April 23, 1968 O. H. ZINKE 3,379,969
MAGNETIC BRIDGE MEANS FOR DETECTING THE
ELECTRICAL PROPERTIES OF SUBSTANCES
Original Filed Aug. 9, 1963 2 Sheets-Sheet 2

INVENTOR:
BY OTTO H. ZINKE
John E. Taylor
ATTORNEY,

United States Patent Office 3,379,969
Patented Apr. 23, 1968

3,379,969
MAGNETIC BRIDGE MEANS FOR DETECTING THE ELECTRICAL PROPERTIES OF SUBSTANCES
Otto Henry Zinke, 817 N. Jackson Drive, Fayetteville, Ark. 72701
Continuation of application Ser. No. 301,133, Aug. 9, 1963. This application Nov. 25, 1966, Ser. No. 597,167
9 Claims. (Cl. 324—34)

ABSTRACT OF THE DISCLOSURE

A magnetic device for detecting and measuring the electrical properties of substances including a magnetic bridge circuit defined by similar parallel magnetic paths each having at least one air gap therein for positioning a member having predominately electrical characteristics to be measured, means for establishing varying magnetic flux in said parallel magnetic paths, other means connected between intermediate points of said parallel paths including a shunt flux path and means for detecting the flux in said shunt path, and a specimen having predominately electrical characteristics positioned in an air gap in each parallel flux paths whereby eddy currents are induced therein by the varying flux, differences in the electrical characteristics of the specimens in said paths causing detectable flux to be produced in the shunt flux path.

---

This is a continuation of application Ser. No. 301,133, August 9, 1963, now abandoned.

This invention involves certain principles and apparatus particularly useful in areas of detection, measurement and control, and is particularly related to the provision of a flux-activated comparator or modulator.

There is a wide and growing demand for sensitive controls responsive to such variables as temperature, rate of fluid flow, pressure, radiation flux, strain, thickness, magnetic and electric properties of material. There also exists a need for checking specimens against a standard. Although there are existing devices for such tasks, the apparatus to be described represents an advance in the art from such viewpoints as sensitivity, selectivity, stability, reliability, life, cost and compactness.

Some of the existing devices for such use utilize an electric circuit in which matter to be tested forms some part of the circuit. For example, a metallic specimen may be evaluated by means of an electric circuit wherein the specimen acts as a resistance or influences the reactance of a reactor, so that the losses caused by the specimen reflect its electrical properties, and thereby provide an approximate measure of other conditions, such as temperature or composition. Such an electric circuit system, however, is influenced by coupling losses of the associated portions of the circuit by which the specimen is coupled to the circuit as well as the losses caused by the specimen. If the specimen has an electrical impedance inherently low in relation to that of the coupling connections, such as to the leads, contacts, or inductive couple, the significant information (losses in the specimen) tends to become lost among the greater coupling losses with the result that sensitivity is poor, or it becomes necessary to use large amounts of energy and costly associated apparatus in order to obtain a useable signal.

Accordingly, a principal object of this invention is to provide a more sensitive device wherein coupling losses are reduced to a minimum. In accordance with the present invention, this objective is achieved by comparing flux levels rather than electric signals. Flux levels are affected both by energy loss in any flux circuit and by permeability in a magnetic flux circuit or dielectric constant in an electric flux circuit. For the purposes of this discussion, a flux circuit is taken to be a circuit in which there is a magnetic or electric field as distinguished from moving charge.

Energy losses in flux circuits can occur through flux radiation, the system's traversing hysteresis loops, eddy current losses, absorption of energy by magnetic or electric dipoles or higher ordered poles in the solid, with subsequent transfer of this energy to lattice of the solid, and in other ways. All of these ways, and other ways not mentioned, result in the susceptibility of the flux circuit having an imaginary part. The real part of the susceptibility of a flux circuit is affected by permeability in magnetic circuits and dielectric constant in electric circuits. For the purposes of this discussion the real and imaginary parts of the susceptibility will be called impedance. If the imaginary part is referred to in particular, it will be called loss.

By working with flux circuits, and especially magnetic flux, it is possible to achieve a substantial reduction of coupling losses compared to such losses in an electric circuit. As an example, in measurements of composition of materials through eddy current losses, it was found in using an electric circuit that the coupling losses were on the order of magnitude of 5 milliwatts compared with a sample loss of 6.5 milliwatts. With a ferrite flux circuit the estimated coupling loss (from manufacturer's specifications) are on the order of 8 microwatts compared with a sample loss of about 5 milliwatts. Consequently, samples can be measured with much smaller coupling losses and with much more accuracy. Resistance changes of approximately five ten-thousandths of an ohm in an estimated five ohms have been measured with one of these devices.

In one embodiment of the invention, a magnetic flux control is constructed so as to have a pair of similar magnetic circuits or branches of flux conducting material, and each circuit has a pair of flux impedances in series with one another. One of the flux impedances in one of the branches can serve as a reference or standard. A similarly placed flux impedance can become the variable to be compared to the standard. The remaining flux impedances can be matched as nearly as possible geometrically to become matched impedances. The two circuits are driven in parallel by a common source of flux, and a flux shunt connects the two circuits between their respective impedance portions. When a flux impedance in one circuit differs from the reference impedance in the other circuit, flux will be present in the shunt, the amount of shunt flux being proportional to the difference in impedances. Flux in the shunt can then be detected and measured in various ways depending on how the driving flux is introduced in the circuit and on the intended disposition of the signal.

Flux can be introduced into the common driving circuit in such a manner that it will not normally vary in time. This flux will be called DC flux, and the embodiment will be called a DC flux circuit. DC flux can be produced in magnetic circuits by using coils with DC current of by using permanent magnets as the common flux source. In DC electric flux circuits, flux may be produced by application of DC electric fields from external generators of by electrets or by some other permanently polarized material such as polarized barium titanate. In the DC flux circuits the loss elements must, in general, be in motion (such as in a magnetic circuit where eddy currents would be created in the sample). The impedance corresponding to the real part of the susceptibility need not be in motion. The flux in the shunt can be detected in various ways. Magnetic or electric dipoles placed in an interrupted shunt and held in position by springs can change position with flux level. With a magnetic flux circuit, two windings can be placed on the shunt, one being the exciting winding and connected to a generator of AC current. The other winding will be the pickup winding, and the magnitude of the output signal mill depend on the flux level in the shunt. With an electric flux circuit an electrostatic DC voltmeter can be attached to either side of the interrupted shunt to show voltage balance or unbalance. Oher methods such as ballistic galvanometers (with moving impedance elements) can be used.

Flux can be introduced into the common driving circuit in such a manner that it will vary with time, whether as a single pulse or as a series of pulses of the same or alternating polarity. Such flux will be called an AC flux. Flux can be introduced in magnetic flux circuits in such a manner by winding and a changing current in the windings. In an electric flux circuit, changing flux can be introduced by changing electric fields. The shunt flux can be detected in an AC magnetic circuit by use of a winding about the shunt and the subsequent generation of current in the windings. Shunt flux can be detected in an AC electric flux circuit by AC electrostatic voltmeters or electrometer tubes. It may be deemed feasible to operate such flux circuit with AC and DC flux simultaneously, for example to take advantage of more favorable permeability characteristics in the flux circuit caused by the DC flux.

A preferred structural arrangement for magnetic flux devices may be readily made by providing a pair of H-shaped pieces of soft ferrite (or other low-loss low-rententivity material). The pieces are disposed in spaced parallel planes so that their ends are in registry. The center portion of each piece is provided with a winding, and the pieces are disposed so that the axes of the windings are at right angles. One of the windings serves as an exciting winding for creating flux, and the other becomes an output winding for detecting flux in the shunt in an AC flux circuit or a DC flux circuit with a moving impedance. In a DC flux circuit with static impedances, another winding powered by AC current may be added over the output winding to measure flux level by measuring the change in permeability of the shunt as mentioned above. For a DC flux circuit the H- or X-shaped ferrite with the exciter winding could have the winding removed and be made of magnetically hard material in such a manner that it was permanently polarized, having two arms of the X or one side of the H as a north pole, with the remaining two arms on the other side as a south pole. Impedance elements of approximately equal value are disposed between the pieces at the four registered ends. Depending upon the use of the device, the elements may be modified or replaceable.

A preferred structural arrangement for electric flux devices may be readily made by providing two pairs of identical bars of metal or dielectric material coated on at least one side with a conducting coating. Two pieces are disposed parallel and the other two pieces are also disposed parallel in a plane which is parallel to the plane formed by the first two pieces, however so that the first two parallel pieces are at righ angles to the second two parallel pieces. The ends are in registry. Impedance elements of approximately equal value are disposed between the pieces at the four registered ends. A field generator is connected between the first two pieces, and a voltmeter or electrometer is connected between the second two pieces. For DC electric flux, an H-shaped electret polarized plus on one side of the H and negative on the other could be used as the flux source.

As an example of how such a flux circuit could be used to measure in the manner in which thermocouples, thermostats, thermometers, or bolometers are used, an AC magnetic circuit is considered. Of the four impedance elements, two are placed, one each, in similar positions in each of the flux circuits. The third may be a standard and the fourth the specimen to be tested. In this event the flux in the shunt provides a signal which is proportional in strength to the differences between the test specimen and standard. The specimen may be designed to detect heat or radiation while the standard is shielded from radiation, thereby providing an ambient-temperature compensated radiation detector. A thermocouple-like device, thermostat, thermometer or bolometer can be made by utilizing as the reference and standard two materials or elements whose impedances (magnetic or electric) change at differing rates with changes in temperature. The sensitivity of a flux-activated control is such that the thermal responsive versions can be used as flow meters or pressure gauges, as by subjecting one element to the cooling or heating effect of a fluid to be measured, while the reference impedances are protected from or are independent of such effects. There are many other applications. A modulator may be made by placing as one impedance element a material whose impedance can be changed with electric current or voltage (for example, the permeability of ferromagnetic materials changes with the electric current in a coil wrapped about the material). The device may be set to null flux in the shunt arm and the electric current or voltage then applied to the changeable impedance. The result is that flux appears in the shunt in general in proportion to the impressed electric signal. An amplifier can be made much the same way with an AC flux device, providing that the output is properly rectified and smoothed before use. Other uses such as switches, suggest themselves, wherein the switched signal is the input to the flux device. When the impedances are all in place the shunt flux may be adjusted to null and the switch is "open." When one impedance is removed, shunt flux appears and the switch is "closed." Advantages of such switches are the lack of contact problems, and in AC circuits a transformer is not required since the impedance matching may be wound directly into the flux device. Also, such switches may be constructed so that a large number of output circuit choices occur with a single input and in a very small space, a problem encountered in telephone switching.

Proximity switches may be made by widening the distances between the parallel planes in which the H's or or X's mentioned previously are disposed. Objects brought into the leakage flux easily unbalance the flux device at distances as large as four inches. All manner of mechanical electrical transducers immediately suggest themselves.

Referring now to the accompanying drawings,

FIG. 1 is an exploded perspective view, in part diagrammatic, illustrating one embodiment of a flux-controlled comparator made in accordance with the invention;

FIG. 2 is a top plan view of the device shown in FIG. 1;

FIG. 3 is a section on the line 3—3 of FIG. 2;

FIG. 4 is a section on the line 4—4 of FIG. 2;

FIG. 5 is a view similar to FIG. 2, but showing another embodiment of the device;

FIG. 6 is a section on the line 6—6 of FIG. 5;

Figure 7:
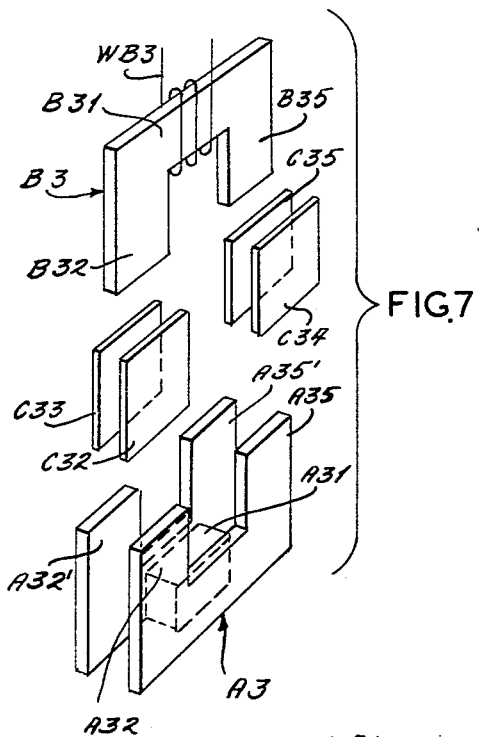
FIG. 7 is an exploded perspective view of another comparator embodying the invention.

High sensitivity from a flux-activated control is preferably achieved by constructing the flux circuits with a material that has low losses in relation to the matter tested. In making a magnetic flux device, one suitable material is ferrite or finely divided magnetic particles with insulating surfaces sintered or cemented into desired shapes. Ferrites have very low-eddy-current losses, for example, one to two microwatts per cubic centimeter at frequencies up the megacycle range. Laminated transformer iron or silicon steel may be used at lower frequencies, say sixty cycles. A soft iron or high permeability, say 500 or greater, and a retentivity of about 1000 gauss or less is generally desired in those applications involving rapidly fluctuating flux levels. The structure may take any of a variety of forms, but a particularly economical form is achieved by using H-shaped, X-shaped or C-shaped members, or members which are the result of H-shapes or X-shaped in combination or in combination with C-shapes. Electric flux devices can be made of barium titanate or other materials having a substantial dielectric constant.

FIGS. 1–4 illustrate H-shaped flux circuit members A1 and B1 of square outline with center sections A11 and B11 from whence, respectively, extend end sections or poles A12, A13, A14, A15 and B12, B13, B14, B15. The members A1 and B1 are molded or machined from soft iron, ferrite or the like. Each member is symmetric in the sense that its end sections are of the same shape, size and disposition relative to the center section, and the two members are identical, but are differently oriented in space. The flux circuit members are disposed in parallel planes with their corners in registry, but with their center sections A11 and B11 at right angles. The center sections A11 and B11, respectively, carry windings WA1 and WB1, whose axes lie at right angles. If WA1 is an exciting or magnetizing winding, it will be apparent that the flux induced thereby is divided between two closed-loop flux circuits, one of which is defined by sections A11, A12, B12, B15, A15, and the other of which is defined by sections A11, A13, B13, B14, A14. In the first-mentioned circuit, the flux traverses gaps between the opposed faces of end sections or poles A12 and B12, B15 and A15. In the other circuit the flux traverses gaps between similar faces of poles, A13, and B13, and B14 and A14.

FIG. 1 illustrates four impedance elements C12, C13, C14 and C15 in the form of conductive pieces of approximately the same shape, size and composition.

Such impeding elements need not be in the gaps, nor need there be gaps given some other flux impeding means. In many applications, the flux impedances will be largely a result of eddy-current losses in the impedance elements, in which event a frequency of, say, 15 kilocycles may be suggested depending on the depth of eddy-current penetration desired. When each element has the same flux-impeding effect, the total flux will divide symmetrically between the two circuits described above, but if one element differs in impedance from the others, the flux pattern becomes asymmetrical. In the first situation of symmetrical flux or impedance, there is comparatively little flux in the shunt section B11. As the flux patterns become increasingly asymmetrical, there is increasing flux in the shunt section B11. Given a fluctuating flux in the shunt section B11, a signal is generated in winding WB1, the strength of which is a measure of the degree of asymmetry of the impedance elements.

Turning now to FIGS. 5–6, there is shown a slightly different form of structure utilizing X-shaped pieces, A2 and B2 of identical shape and disposition, but with their center section windings WA2 and WB2 on axes at right angles to one another. In this embodiment, the respective poles, center sections and windings, as well as the respective impedance elements, are designated by the same reference character as that applied to its counterpart in FIG. 1 except that the first numeric digit is "2" (in FIGS. 5–6) instead of "1" (in FIGS. 1–4). The above described H-shaped and X-shaped structures are economical versions of this device, but it will be apparent that symmetric flux branches or circuits with a common exciting source and flux shunt can be achieved in a variety of structures.

Figure 8:
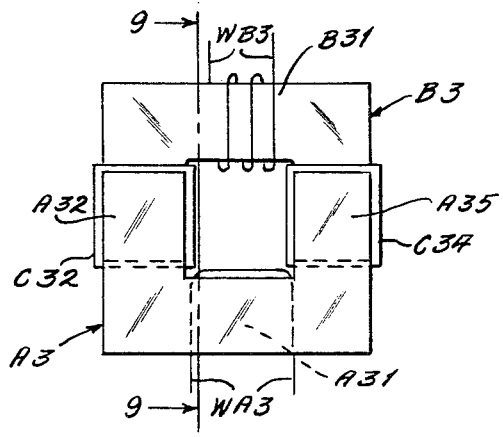
FIG. 8 is a side elevation of the (assembled) comparator shown in FIG. 7.
Figure 9:
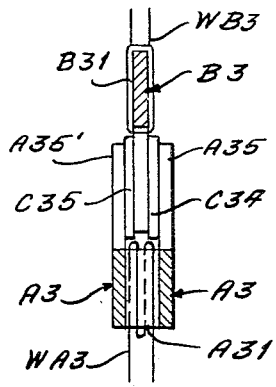
FIG. 9 is a section on the line 9—9 of FIG. 8.

FIGS. 7–9 illustrate one version of a folded H configuration. One of the flux circuit members B3 is flat and of C shape, whereas the other flux circuit member A3 is made up of two C-shaped parts joined by a center section A31. The circuit member A3 has a center section A31 carrying winding WA3, whereas the circuit member B3 has a winding WB3 on its center section B31. One flux circuit is defined by parts A31, A32, B32, and A32'; the other flux circuit by A31, A35, B35 and A35'; while section B31 serves as a flux shunt. WA3 is the flux generating winding and WB3 the flux sensing winding. C32, C33, C34 and C35 are the impeding elements.

It has been pointed out that the losses in the ferrite sections are very low in relation to the losses caused by the gaps and the impedance elements designated by the reference character C (followed by numeric suffix). Hence the ferrite flux circuit sections need not be constructed to exceptionally close tolerances. Moreover, a lack of symmetry can be overcome or corrected in any of a variety of ways, as by shimming or adjustment of metal screws or trimmer impedances disposed adjacent to one or more of the circuit sections. Once the device is adjusted to a condition of symmetry, balance or null, change in one impedance, or in the flux of one circuit in relation to that of the other circuit, is reflected by a change in the level of flux within the shunt (designated throughout by reference characters in which the first digit is "B" and the third digit is "1"). Accordingly, the device is sensitive to variations in the electric or magnetic properties of the impedance elements or to conditions tending to change the flux impedance of the impedance elements (designated throughout by reference characters which begin with "C"). This characteristic can be utilized for a variety of purposes.

For example, if one of the elements is made sensitive to radiation of any type in a manner such that its temperature is changed, while the other impedance elements are protected from such radiation, the device becomes useful in detecting or measuring such radiation. In such instance, one would use an impedance element whose electrical or magnetic properties change with temperature. Sensitivity to electromagnetic radiation can be increased by means of a black or other heat absorptive (as distinguished from reflection) coating on the element which senses the radiation, the other elements having a reflective surface or other shield. It will be understood that the device responds to eddy-currents generated within the impedance elements (as by an oscillatory excitation), that the eddy-currents respond to the resistance of the impedance element, and that resistance varies with its temperature, and that temperature may be developed by radiation striking the element. Radio frequency radiation sensitivity or selectivity can be further heightened by forming dipoles of suitable length on the element.

An example of the use of a flux comparator as shown in FIGURE 1 is a simple electromagnetic radiation detector which can be made by using aluminum foil pieces as the elements in an AC flux device. One piece (C14) is painted black and in part exposed to radiation while the other elements (C15, C12, C13) are uncoated, and the blackened element should project out from the pole-gap to receive radiation. The resistance of the blackened element increases with energy absorbed and subsequent temperature rise, Therefore, the eddy-current loss in this foil decreases unbalancing the shunt. A crude device of this character was found to have an output voltage sensitivity to the radiation of about 30 volts per watt of incident radiation. The device automatically compensates for ambient temperature variations affecting all of the impedance elements if adjacent elements are of the same material.

This device can be made responsive to ambient temperature by using for C14 for, example, an element of any material whose electrical conductivity varies with changes in temperature at a rate differing from that of C15. Elements C12 and C13 would be made of the same material. A vacuum or pressure gauge can be made by protecting one element from the fluid to be gauged, as by disposing it in an evacuated envelope while another element is exposed to the fluid. Both elements could be heated, as by small electric heaters or by other absorbed energy.

Since the element exposed to the fluid will lose heat by conduction to the fluid, the device is responsive to the density of the fluid. Another application of this device is fluid flow measurement where rate of heat exchanged to an exposed element changes proportional to the fluid flow rate. Again an external heating element can be used to heat two of the elements differentially depending on the flow rate.

A sensitive strain gauge is made by using as an impedance element a material whose electric or magnetic properties are responsive to strain. A thickness gauge for testing conductive or energy absorbtive materials is made by passing the tested material through or past the device so that the tested material becomes an impedance element, while another impedance element is made of the same material in the desired thickness to which the specimen is to be compared.

In this respect, it will be helpful to view one of the elements, say C12, as the specimen or variable and its opposite element C13, as the standard or reference. The elements C14 and C15 should be similar in their effect to the reference element C13, and should be matched with each other. Indeed, the elements C14 and C15 may be a single piece spanning the space between poles A14 and A15.

Considered in this light, the device is useful in comparing specimens against a selected standard. In such an application, the comparator is adjusted to symmetry with a known specimen C12 which matches the standard C13. The selected specimen C12 of known characteristics is removed and replaced with a specimen of unknown characteristics. If the comparator goes out of symmetry, one then knows the specimen differs from the standard C13, and original specimen C12 to which the comparator was adjusted. This application will prove useful in a variety of fields such as quality control and validity determination.

Figure 10:
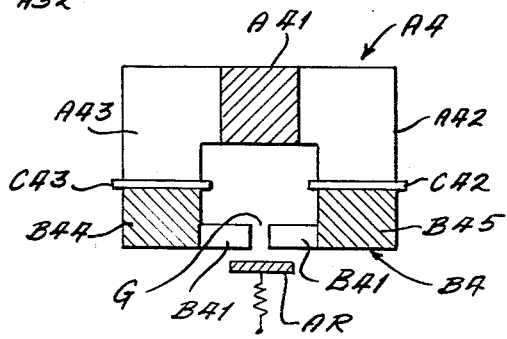
FIG. 10 is a view similar to FIG. 3, but showing a different version of the device.

In many applications of this device, it will be advisable to have an electric signal as a measure of the degree of asymmetry or inbalance, and in that event, it will be advisable to use a fluctuating excitation, such as that provided by an alternator or even an oscillator. It should be understood, however, that there may well be applications where the magnetizing force can be stable, in which event a permanent magnet may be used as the center section A11 of the FIG. 1 embodiment, for example. Similarly, the shunt flux detection need not be electric but might take the form of a movable part. For example, a gap could be cut across the flux shunt section B11 and an armature disposed in overlapping relation with the gap and normally biased outwardly. The armature would be attracted to the shunt by flux within the shunt when the device unbalanced. This is shown in FIG. 10, where (with the exception below noted) A4 corresponds generally with A1, A41 with A11, B4 with B1, B41 with B11, C42 with C12, etc., of FIG. 4. The winding on A41 is omitted since this section would be of high rententivity and permanently magnetized. The gap in B41 is shown at G and the armature is designated AR. The armature could move an indicator, actuator or electric contact.

Figure 11:
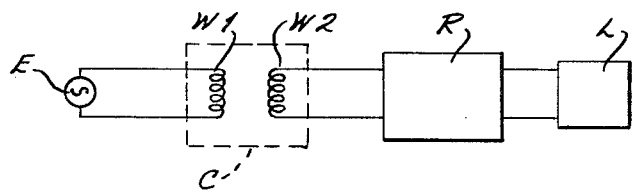
FIG. 11 is a schematic circuit diagram of a simple form of control circuit, such as might be used with the comparator of the invention.

Referring to FIG. 11, the comparator C is shown with an electric circuit having an oscillator type of exciter E connected to the exciting winding W1, whereas the shunt winding W2 is connected through any suitable amplifier and rectifier section R, of conventional character, to a load L, which may be a relay, solenoid actuator or indicating voltmeter calibrated in terms of a quantity one desires to measure. As such, the output is proportional to the degree of unbalance in the two flux circuits of the comparator. This approach could be used in most applications of the device. In those cases where it is important to know whether the specimen has greater or lesser impedance than the standard, a phase comparing section of conventional character would be included with the amplifier section. The details of such circuits are not described since they are well known in the electronics art and do not form a part of this invention.

In addition, the principles disclosed are applicable to the construction of various sorts of electric switches, transducers, amplifiers and modulators. For example, one of the impedance elements might be movable, in which event, the shunt flux will be modulated in accordance with the movement of the impedance element. Various windings can be added to various sections of the magnetic device, including the impedance elements, to develop fluxes which supplement, counteract or modulate the principal flux. In the examples described in detail, the magnetic circuits would normally be operated below saturation, but it might be desirable in some applications to take advantage of the saturating characteristic of magnetic materials in the flux circuit. Indeed, the disclosed principles of operation, and features of construction have very wide application, and this disclosure should be taken as being merely illustrative of the possibilities of the invention without limitation to the specific forms herein described.

What is claimed is:

1. A magnetic flux activated control comprising two cores of magnetic material each core having a center section and at least two end sections with a coil wound upon the center section of each core, the axes of said coils being substantially perpendicular to one another and lying in separate parallel planes, the end sections of one core overlapping and being in closely spaced parallel position with the end sections of the other core to form four air gaps therebetween, the center section of each core being connected to the two end sections thereof at intermediate locations on the said end sections whereby the four air gaps include two pairs of equal air gaps, the air gaps of each pair being equidistant from the center section of each core, specimens of a material different from that of the cores within each of the air gaps, AC energization means connected to the coil on one of said cores and output signal utilization means connected to the coil on said other core.

2. The magnetic flux activated control defined in claim 1 wherein the specimen in one of said two pairs of equal air gaps includes a standard element of known characteristics, the specimen in the other of said same pair of air gaps being the specimen being tested, the specimens disposed in the other two equal air gaps being similar to each other.

3. The magnetic flux activated control defined in claim 2 wherein the specimen being tested is positioned to respond to a radiation source while the other specimens are nonresponsive to said radiation source.

4. The magnetic flux activated control defined in claim 2 wherein the specimen being tested has a resistance-temperature coefficient different from the standard.

5. The magnetic flux activated control defined in claim 1 wherein the specimen in each of the air gaps includes an impedance element having electrical conductive properties.

6. The magnetic flux activated control defined in claim 1 wherein the cores of magnetic material are substantially H-shaped.

7. The magnetic flux activated control defined in claim 1 wherein the cores of magnetic material are substantially X-shaped.

8. The magnetic flux activated control defined in claim 1 wherein the cores of magnetic material are substantially C-shaped.

9. The magnetic flux activated control defined in claim 1 wherein means are provided for exposing one of the specimens in one of the air gaps to a condition capable of producing a change in its electrical properties relative to the electrical properties of the specimens in the other air gaps, said change causing a detectable flux to be established in the center section associated with the output signal utilization means.

References Cited

UNITED STATES PATENTS

| | | | |
|---|---|---|---|
| 1,697,148 | 1/1929 | Spooner | 324—34 |
| 2,020,067 | 11/1935 | Keinath | 324—34 |
| 2,827,609 | 3/1958 | Smith | 324—34 |
| 3,029,380 | 4/1962 | Nicol | 324—34 |
| 3,271,664 | 9/1966 | Mountz et al. | 324—40 |

FOREIGN PATENTS

| | | |
|---|---|---|
| 765,071 | 1/1957 | Great Britain. |
| 875,710 | 8/1961 | Great Britain. |
| 142,466 | 1961 | U.S.S.R. |

RUDOLPH V. ROLINEC, *Primary Examiner.*

WALTER L. CARLSON, *Examiner.*

R. J. CORCORAN, *Assistant Examiner.*

UNITED STATES PATENT OFFICE
CERTIFICATE OF CORRECTION

Patent No. 3,379,969                                April 23, 1968

Otto Henry Zinke

It is certified that error appears in the above identified patent and that said Letters Patent are hereby corrected as shown below:

Column 2, line 61, "of" should read -- or --; line 64, "of" should read -- or --. Column 3, line 6, "mill" should read -- will --; line 10, "Oher" should read -- Other --; line 17, "winding" should read -- windings --; line 30, after "shaped" insert -- or X-shaped --; line 60, "righ" should read -- right -- Column 7, line 59, "rententivity" should read -- retentivity --.

Signed and sealed this 28th day of October 1969.

(SEAL)
Attest:

Edward M. Fletcher, Jr.                            WILLIAM E. SCHUYLER, JR.
Attesting Officer                                     Commissioner of Patents